Nov. 27, 1928.
W. H. PIERCE
1,693,565
LUBRICATING APPARATUS
Filed March 14, 1922
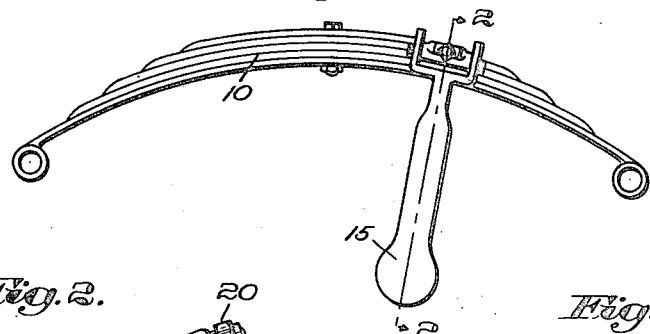
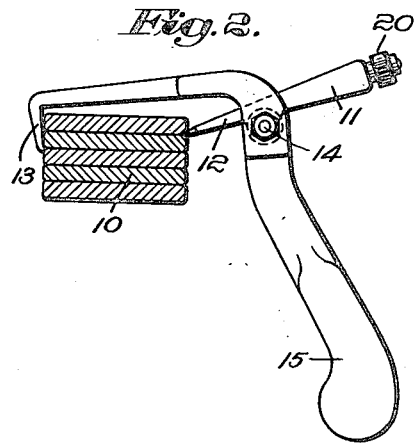
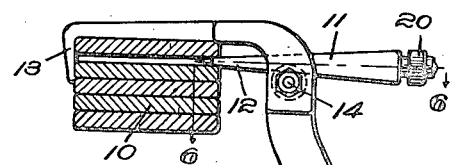
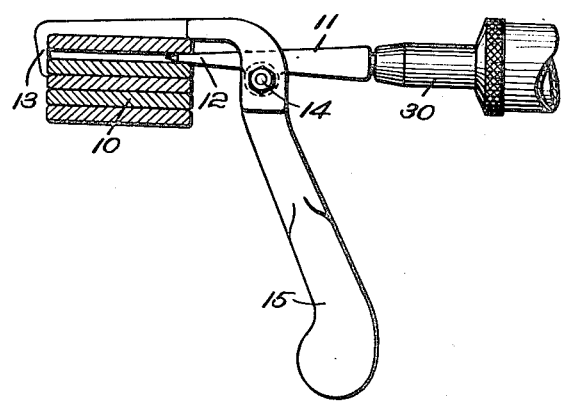
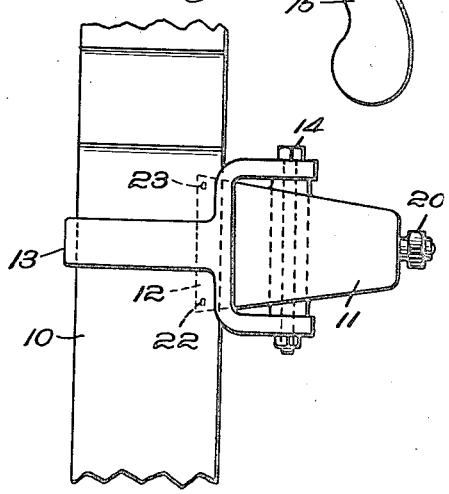
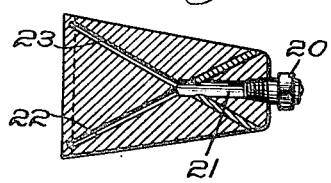
Inventor:
Walter H. Pierce, Patented Nov. 27, 1928.

1,693,565

UNITED STATES PATENT OFFICE.

WALTER H. PIERCE, OF WATERTOWN, MASSACHUSETTS, ASSIGNOR, BY MESNE ASSIGNMENTS, TO ALEMITE MANUFACTURING CORPORATION, OF CHICAGO, ILLINOIS, A CORPORATION OF DELAWARE.

LUBRICATING APPARATUS.

Application filed March 14, 1922. Serial No. 543,549.

This invention pertains to improvements in lubricating apparatus. It is among the objects of the invention to provide improved mechanism for lubricating leaf springs.

In the drawings, which show a preferred form of one embodiment of my invention:—

Fig. 1 is a side elevation of a spring having a lubricating device attached thereto;

Fig. 2 is a section on the line 2—2 of Fig. 1, prior to completion of the attachment and being partly in elevation;

Fig. 3 is a view similar to Fig. 2, but showing the relation of the parts after completion of the attachment to the spring;

Fig. 4 is a view similar to Figs. 2 and 3, showing the device with the source of lubricant under pressure connected thereto;

Fig. 5 is a plan view of the device illustrated in Figs. 2 and 3; and

Fig. 6 is a section on the line 6—6 of Fig. 3.

Referring to the drawings and to the preferred form of my invention selected for illustrative purposes, I have shown a leaf spring 10 composed of a plurality of superimposed leaves and which may be of the usual construction used in connection with automobiles and the like. The object of the present invention is to introduce lubricant between the leaves of such springs. To this end, I have shown a lubricant-conducting part 11 having a wedge-shaped end 12 adapted to be forced between the leaves of the spring and cooperating with an applying attachment including a hook portion 13 adapted to pass over the opposite side of the spring, a pivot 14 where the applying device is connected to the lubricant-conducting part 11 and a handle 15. The hook portion 13, handle portion 15 and intermediate parts, preferably with the exception of the wedge-shaped member, may be integral as illustrated, the whole constituting in effect a lever, preferably forked and divided at its center where it carries the lubricant-conveying part 11. Lubricant may be to the best advantage introduced between the spring leaves at points not far removed from the end of the adjacent underlying or overlying spring leaf. Thus, as viewed in Fig. 2, if it is desired to introduce lubricant beneath the upper spring leaf and above the underlying spring leaf, the hook portion 13 of the lever is passed over one side of the spring and the wedge-shaped end 12 of the lubricant conduit 11 is introduced into the groove between the edges of the spring, the edges of each leaf ordinarily being sufficiently beveled to provide such a groove. If now the handle portion 15 of the lever be pressed inwardly and downwardly, the wedge 12 will be carried between the spring leaves and will separate them as illustrated in Fig. 3.

The lubricant conducting part 11 may be provided, preferably at its outer end as illustrated, with a suitable lubricant-receiving nipple 20 for attachment to a grease gun or other suitable source of lubricant supply. A conduit 21 in the lubricant conducting part 11 may communicate with divergent passages 22, 23 extending relatively near the end of the wedge-shaped portion of the lubricant conducting part, there preferably coming out to the surface on opposite sides to admit of escape of lubricant both on the upper and lower wedge surfaces.

It follows, therefore, that if a source of lubricant under pressure, which may be a lubricant gun 30, be connected to the nipple 20 and lubricant forced therethrough, an effective introduction of lubricant between spring leaves at the most desired points may be very readily effected.

Movement of the parts of the device from the position of Figure 2 to that shown in Figure 3 carries the line joining the center of pivot 14 and the engaging portion of hook 13 well past the toe edge of the wedge, thereby acting as a toggle in which the pivot point is carried beyond dead center. Thus any tendency of the wedged portion 12 to be forced from between the leaves of the spring is not effective to unclamp the device from the leaf spring since such force tends merely to swing the lever 15 clockwise holding the horizontal portion adjacent the hook 13 against the top face of the upper leaf of the spring, as shown in Figure 3. Thus after the device is attached to a spring as in Figure 3 it is more or less clamped in that position so that the operator need not hold it but may use both hands in the operation of the compressor to inject the lubricant between the separated leaves of the spring.

The application of the device is so simple that in lubricating a spring the lubricant gun may be left in connected position during the application of the device to the various points of the spring which are to be lubricated.

While I have shown and described a preferred embodiment of my invention, it will be understood that considerable changes may be made without departing from the scope of the appended claims.

I claim:

1. A lubricating device for leaf springs presenting a lubricant conducting part and a lever part for forcing an end of said lubricant conducting part between adjacent spring leaves, said lubricant conducting part pivotally connected to said lever part at a point lying at that side of said conducting part opposite the portion of said lever part engaging the spring and presenting an exposed lubricant-receiving nipple for engagement with a source of lubricant under pressure.

2. Lubricating means for leaf-springs comprising wedge means, toggle means for actuating said wedge means to wedge one leaf away from the rest of the spring, said means being proportioned to prevent use of said wedge and toggle means to separate more than one leaf, and means for ejecting lubricant near the edge of the wedge, said toggle means moving past dead center position when completely attached to the spring, thereby to hold the device on the spring.

3. Lubricating means for leaf-springs comprising wedge means having a toggle action for wedging one leaf away from the rest of the spring, and means for injecting lubricant between the separated leaves, said wedge means moving past dead center position when completely attached to the spring, thereby to hold the device on the spring.

4. Lubricating means for leaf-springs comprising wedge and toggle means for wedging one leaf away from the rest of the spring, and means for injecting lubricant under the separated leaf, said toggle means moving past dead center position when attached to the spring and abutting the outer face of the separated leaf to clamp the device on the spring.

In testimony whereof, I have signed my name to this specification.

WALTER H. PIERCE.